US009892494B2

(12) United States Patent
Bai et al.

(10) Patent No.: US 9,892,494 B2
(45) Date of Patent: Feb. 13, 2018

(54) REGION-OF-INTEREST BIASED TONE MAPPING

(71) Applicant: Apple Inc., Cupertino, CA (US)

(72) Inventors: Yingjun Bai, San Jose, CA (US); Xuemei Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/614,568

(22) Filed: Feb. 5, 2015

(65) Prior Publication Data

US 2016/0232419 A1 Aug. 11, 2016

(51) Int. Cl.

*G06K 9/46* (2006.01)
*G06T 5/00* (2006.01)
*G06T 5/40* (2006.01)

(52) U.S. Cl.

CPC ................ *G06T 5/007* (2013.01); *G06T 5/40* (2013.01); *G06T 2207/20016* (2013.01)

(58) Field of Classification Search

None
See application file for complete search history.

(56) References Cited

U.S. PATENT DOCUMENTS 7,492,375 B2 2/2009 Toyama
8,339,475 B2 12/2012 Atanassov
9,454,810 B2 * 9/2016 Valdes Lopez ...... H04N 1/4074
2012/0256941 A1 * 10/2012 Ballestad ........... G06K 9/00234 345/589
2013/0314568 A1 11/2013 Vranceanu
2014/0092012 A1 * 4/2014 Seshadrinathan ....... G06T 5/007 345/157

* cited by examiner

*Primary Examiner* — Fred Hu
(74) *Attorney, Agent, or Firm* — Blank Rome LLP

(57) ABSTRACT

Methods, devices and computer readable instructions to generate region-of-interest (ROI) tone curves are disclosed. One method includes obtaining a statistic for an entire image such as, for example, a luminance statistic. The same statistic may then be found for a specified ROI of the image. A weighted combination of the statistic of the entire image and the statistic of the ROI yields a combined statistic which may then be converted to a ROI-biased tone curve. The weight used to combine the two statistics may be selected to emphasize or de-emphasize the role of the ROI's statistic in the final tone curve.

19 Claims, 7 Drawing Sheets

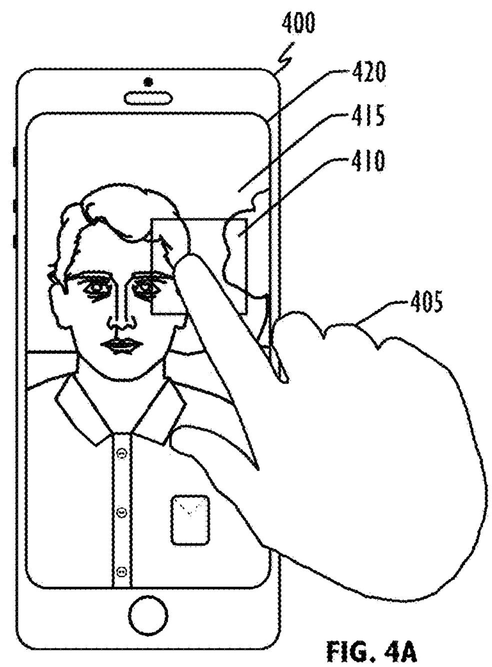
FIG. 4A
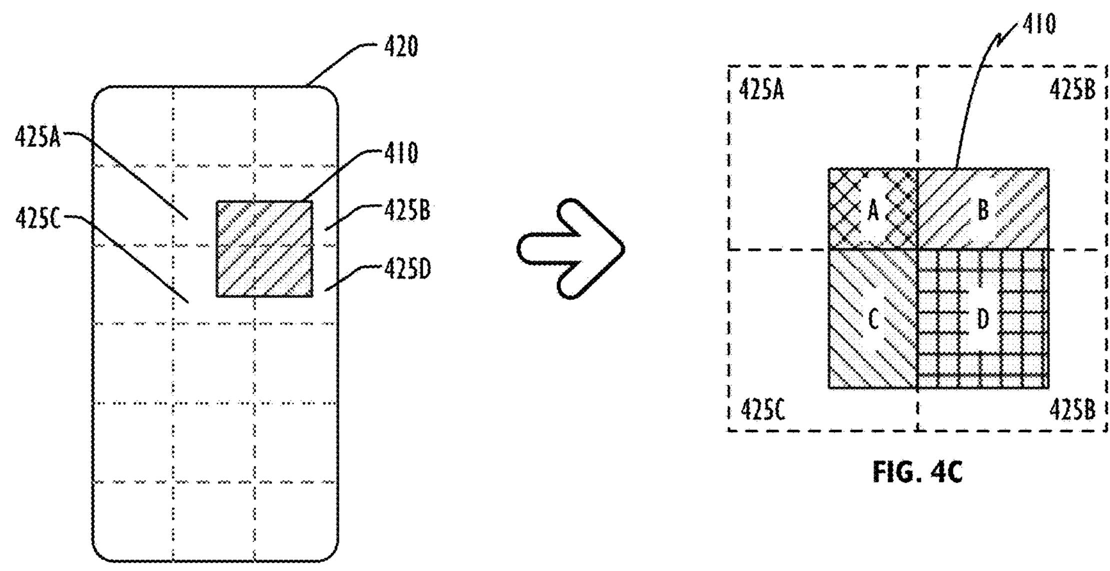
FIG. 4B
FIG. 4C

REGION-OF-INTEREST BIASED TONE MAPPING

BACKGROUND

This disclosure relates generally to the field of image processing and, more particularly, to various techniques to generate tone mapping curves for use in image processing.

Tone mapping is the process of remapping gray levels from a first or input image to different levels in a second or output image. In general, there are two approaches to tone mapping: global and local. Global tone mapping refers to the situation where there is a single tone curve that maps input gray levels to output gray levels. Local tone mapping refers to the case where a single gray level in an input image can map to multiple gray levels in an output image depending on the spatial location and configuration of the input image. In practice, tone mapping is generally used to compress the dynamic range of an input (e.g., captured) image to fit into the dynamic range of an output device with the goal of not losing spatial and color details. This usually involves darkening the input image's bright regions and brightening up the input image's darker regions while keeping local spatial contrast intact. Compressing the global tone range and keeping local contrast are conflicting goals, and trying to do both can lead to visible grayscale reversal (e.g., "haloing" around dark or bright image features, or false gradients in the output image). To minimize grayscale reversal, tone mapping operations have traditionally employed computationally costly spatial processing or complex global-local optimization.

SUMMARY

In one embodiment the disclosed concepts provide a method to generate an image's tone curve that can account for a user's specified region-of-interest (ROI). One method to accomplish this includes obtaining a first image of a scene (e.g., from a memory or image sensor of an image capture device); obtaining a first statistic of the entire first image (e.g., the mean, median, or modal luminance levels all of which may be estimated from an image's luminance histogram); identifying a ROI of the first image (such as that provided through various tap-to-expose operations); obtaining the first statistic of the ROI; determining an ROI-biased tone curve for the first image based on a weighted combination of the first statistic of the entire first image and the first statistic of the ROI; and applying the ROI-biased tone curve to a second image to generate a tone-mapped image. In one embodiment, the first image may be a camera's "pre-image" while the second image may be the image captured in response to a capture command (e.g., pushing a camera's capture button or tapping the equivalent soft-button on a device's touch-sensitive display). As used here, the term "pre-image" means an image temporarily recorded to memory and displayed to a user prior to actual image capture which results in an image being stored in memory for a period of time longer than the pre-image interval (typically 1/30 to 1/60 of a second). In modern digital camera's, the ROI may be specified directly through a touch-sensitive display (e.g., the same device used to display pre-images), or manually through the activation of controls which permit the user to specify a region (less than all) of an image.

Various other forms or implementations of the disclosed methods are possible. For example, the disclosed methods may be implemented in hardware (e.g., via a specialized image processing pipeline), software (encoded in any appropriate manner and using any appropriate programming language), or a combination of these approaches. Such software may be used to drive the operation of a digital image capture device. As used herein, the term "digital image capture device" refers to any unit, component, element or system capable of capturing digital images. This includes stand-alone digital cameras, multi-function devices such as mobile telephones and personal entertainment devices, and computer systems (e.g., desktop, portable, and tablet computer systems). All of these terms may be used interchangeably throughout this disclosure.

BRIEF DESCRIPTION OF THE DRAWINGS

FIGS. 4A-4C show an illustrative image capture device having a region of interest (ROI).

DETAILED DESCRIPTION

This disclosure pertains to systems, methods, and computer readable media to improve tone mapping operations in any system that processes digital images. In general, various means to bias an image's tone curve by a specified region-of-interest (ROI) are disclosed. More particularly, a weighted combination of a specified image statistic may be used generate an ROI-biased tone curve. By way of example, an image's global luminance histogram and the luminance histogram corresponding to the image's user-specified ROI may be weighted and combined. The resulting ROI-biased statistic (e.g., luminance histogram) may be used to generate a tone curve using any of a number of known methodologies. The weight factor used when combining an image's statistic with that of the ROI's statistic may be adapted to alter the influence or significance the ROI plays in the final tone curve. ROI-biased tone curves in accordance with this disclosure may be used to tone-map images as they are captured. In addition, ROI-biased tone curves may be used during multi-scale tone mapping operations or in combination with multi-scale tone mapping operations.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image and graphics processing systems having the benefit of this disclosure.

Figure 1:
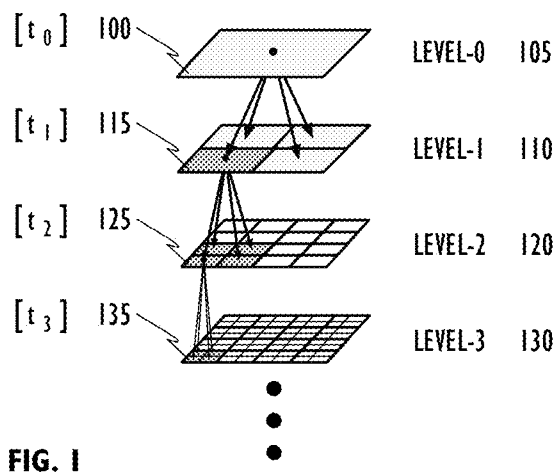
FIG. 1 illustrates the progressive nature of a multi-scale tone mapping operation in accordance with this disclosure.

Before describing a detailed embodiment, it may be useful to obtain a visual impression of how a multi-scale tone mapping operation processes an image. Referring to FIG. 1, input image 100 may include a number of elements (e.g., pixel values based on luminance or chrominance), be characterized by a single luminance histogram from which a single global tone curve ($t_0$) may be generated. Global tone curve $t_0$ may be thought of as level-0 105 in the multi-scale tone mapping operation. Input image 100 may be partitioned into j sub-regions to form level-1 110 (each sub-region including a number of elements), where each sub-region 115 may be characterized by a single level-1 histogram from which a single level-1 tone curve ($t_1$) may be generated. Each sub-region in level-1 110 may itself be partitioned into k sub-regions to form level-2 120, where each sub-region 125 may be characterized by a single level-2 tone curve ($t_2$). Again, each sub-region in level-2 may be partitioned into m sub-regions to form level-3 130, where each sub-region 135 may be characterized by a single level-3 tone curve ($t_3$). This process may be repeated until the resulting tone curves (e.g., the collection of level-3 tone curves) provide the desired level of image enhancement. In some embodiments, the computational cost of going to lower levels may limit the ultimate depth to which the disclosed techniques may be taken. In other embodiments, the visual difference provided by a "deeper" layer (more local tone curves) may not be detectable by one viewing the image and may, at least in some embodiments, not be justified. As described here, each level provides a finer scale of control than any preceding level, and a more coarse scale of control than any succeeding level. In the example shown in FIG. 1, j=k=m=4. This should not be considered as a limiting description. Each level or scale may be partitioned into a different number of sub-regions. Further, the tone curve generation method used at each scale may be different. For example, coarse-scale tone curves may be optimized for efficient grayscale allocation (e.g., level-1 tone curves, $t_1$), while fine-scale tone curves may be optimized for smoothness (e.g., level-3 tone curves, $t_3$).

Figure 2:
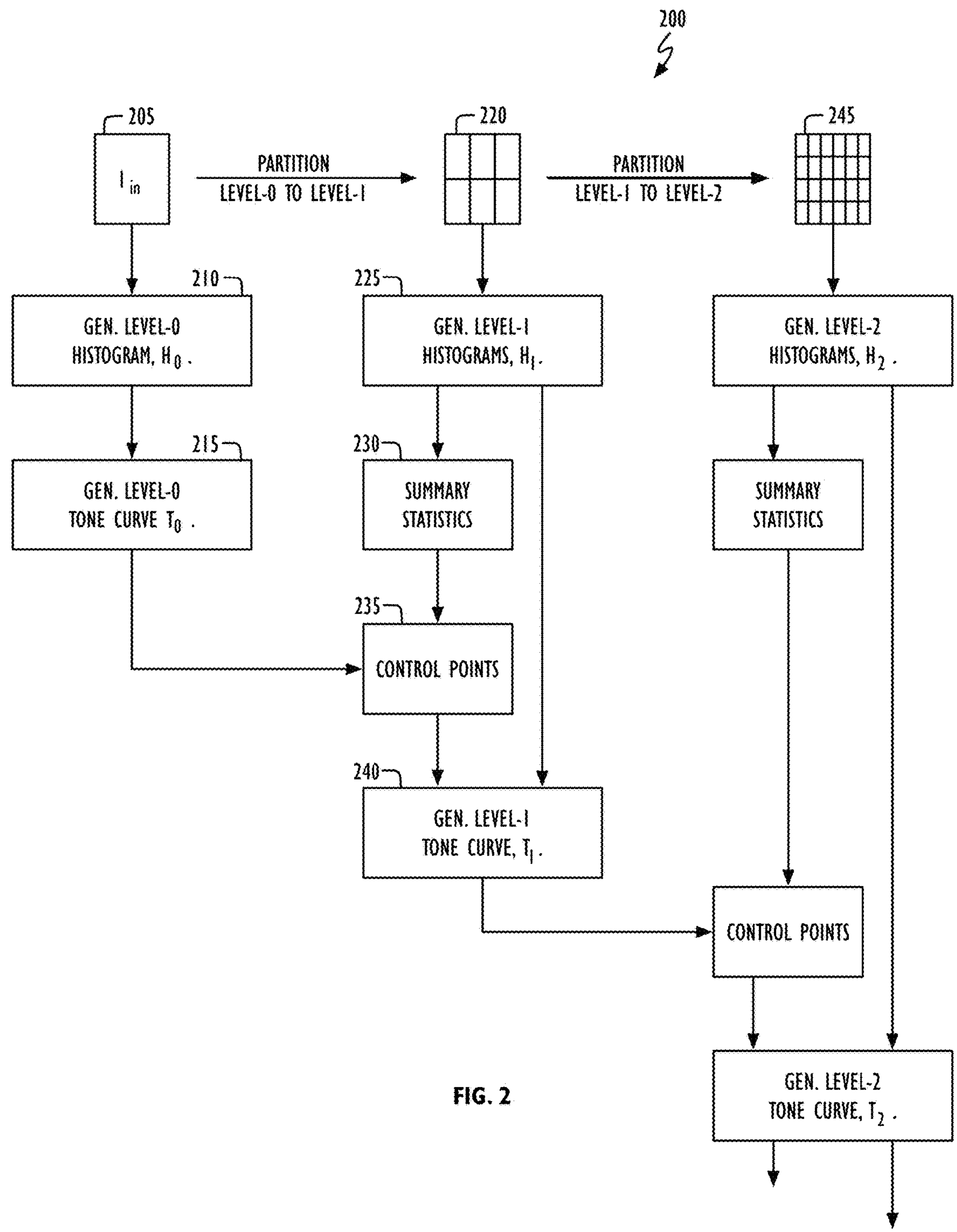
FIG. 2 shows, in block diagram form, a multi-scale tone mapping operation in accordance with one embodiment.

Referring to FIG. 2, multi-scale tone mapping operation 200 in accordance with one embodiment will now be described. For each input image 205, global luminance histogram $h_0$ may be found (block 210) and used to generate global tone curve $t_0$ (block 215). Tone curve $t_0$ may determine how bright the resulting output image will be on a global scale. As noted previously, any tone curve algorithm may be used to generate $t_0$. Level-0 tone curve $t_0$ should be monotonic but does not need to be smooth, since it will not be applied directly to input image 205. One function of level-0 tone curve $t_0$ is to guide the generation of level-1 local tone curves ($t_1$) so as to produce a stable output brightness and to minimize large scale grayscale reversal.

Next, input image 200 may be partitioned or divided into $m_1 \times n_1$ regions as shown in 220. While $m_1$ and $n_1$ can take on any integer value, it has been found beneficial to keep these values small at this level (e.g., 4×3). For each region in level-1 image 220, a luminance histogram $h_1$ may be compiled (block 225). A local tone curve $t_1$ for each region may then be generated such that the general brightness-boost of each region is determined by $t_0$, whereas the contrast of each region is determined by that region's luminance histogram $h_1$. The input luminance level of a local region, designated generally as $M(h_1)$, can be described by any reasonable choice of summary statistics (block 230). For example, one could use the mean, median, or modal luminance levels of the region, all of which can be estimated from the region's local histogram $h_1$. In accordance with one embodiment, when generating a local tone curve the output gray level at input gray level $M(h_1)$ may be constrained at $t_0(M(h_1))$, so that the output of each level-1 local tone curve at $M(h_1)$ follows the monotonic tone relationship of to, thus avoiding gross grayscale reversal (block 235).

The above constraint constrains one point on the local tone curve. Thus, after generating a local tone curve $t_a$, $t_a$ may be adjusted so that it passes through the $[M(h_1), t_0(M(h_1))]$ point. Many different approaches can be used for this adjustment. For example, the simplest adjustment may be to apply a power function to the tone curve. Assuming the output of $t_a$ is normalized to the range 0 to 1, in one embodiment the desired local tone curve $t_1$ may be calculated as:

$$t_1 = t_a^k, \quad \text{EQ. 1}$$

where $$k = \frac{\log(t_0(M(h_1)))}{\log(t_1(M(h_1)))}$$

(block 240). It is also possible to adjust each region's local tone curve to go through the control point during the tone curve generation stage. (As used here, the term "control point" refers to the specific rendering reference position such as the mean of the post tone mapped region lightness as determined by $t_0$ and to be satisfied by a local tone curve, $t_1$.) It may be recognized, however, that methods to achieve this would be specific to each tone curve generation algorithm.

The local tone curves generated at level-1 in accordance with block 240 may be used directly to tone map input image 205. If finer local control of shadow-boost, highlight-suppression, and contrast optimization is desired, multi-scale tone mapping operation 200 may continue level 2. The level-2 (or higher) tone curve generation process is substantially the same as described above with respect to level-1, with two notable differences. First, level-2 tone curves correspond to smaller local regions of image 220 so as to afford finer differentiation of tone curves between regions. To do this, image 220 may be partitioned into $m_2 \times n_2$ regions as shown in image 245, where $m_2 > m_1$, and $n_2 > n_1$. In one implementation, level-2 local regions are half the size of level-1 regions on either dimension, resulting in 4 times as many local regions and thus 4 times as many local tone curves compared to level-1. For further levels, $m_{s+1}>m_s$, and $n_{s+1}>n_s$. Secondly, for each level-2 region $r_2$, its local tone curve $t_2$'s summary brightness-boost may be controlled by the corresponding level-1 tone curves $t_1$ instead of by the global tone curve $t_0$. As illustrated in FIG. 2, every level's tone curve generation is constrained by the tone curve result from the immediate previous level. Since level-1 has multiple tone curves, the control point for $t_2$ should be determined from multiple curves in the set of level-1 tone curves $T_1$. For example, let $t_{1a}$, $t_{1b}$, $t_{1c}$, $t_{1d}$ be the 4 tone curves corresponding to level-1 regions closest to the level-2 region $r_2$, then the output luminance level for $t_2$ at $M(h_2)$ may be given as:

$$t_1(M(h_2)) = \frac{(w_a)t_{1a}(M(h_2)) + (w_b)t_{1b}(M(h_2)) + (w_c)t_{1c}(M(h_2)) + (w_d)t_{1d}(M(h_2))}{w_a + w_b + w_c + w_d}, \quad \text{EQ. 2}$$

where $w_a$, $w_b$, $w_c$, and $w_d$, are weights that are inversely proportional to level-2 regions $r_2$'s distances to level-1 regions a, b, c and d. The level-2 calculations may be repeated to any number of additional levels though, it has been determined, with diminishing tonal quality gains as more levels are added. In may embodiments, it has been found adequate to stop at level-2 and, sometimes, at level-1 if faster computation is desired.

Here, as elsewhere in this disclosure, multi-scale tone mapping curves have been derived from luminance histograms. For example, $h_0$ has been used to indicate the input image's level-0 (global) histogram. Similarly, $h_2$ has been used to indicate a level-2 region's histogram. This should not be understood to mean the use of histograms, however they may be realized, is required to generate tone curves at each level. In general, any consistently used statistic of luminance or intensity may be used to create tone curves adaptive to the specific luminance composition a image/region.

Figure 3A:
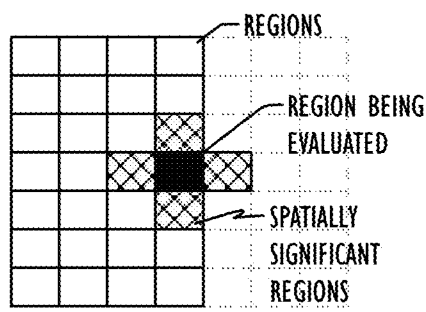
FIGS. 3A-3D illustrates possible spatial relationships local tone curves may employ.
Figure 3B:
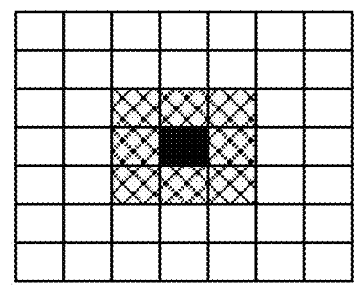
Figure 3C:
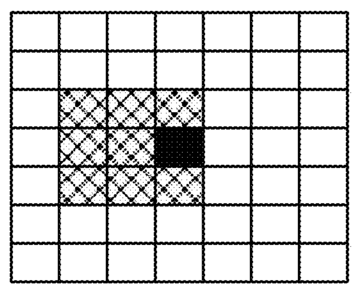
Figure 3D:
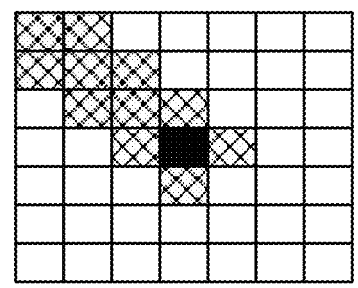

It should also be noted that the embodiment expressed by EQ. 2 is but a single example. As noted, EQ. 2 is directed to an embodiment in which the four closest pixels are significant (see FIG. 3A). However, other embodiments may require or benefit from different spatial relationships. Referring to FIG. 3B, for example, the eight (8) closest pixels may be important. If this is so, EQ. 2 may be modified to include eight (8) possible constraint values and weights. In yet other embodiments, constraining relationships such as $M(h_j)$ and $t_{(j-1)\alpha}(M(h_j))$ may rely on other, non-symmetric, spatial patterns such as those illustrated in FIGS. 3C and 3D. (As used here, $t_{(j-1)\alpha}(\ )$, represents the $\alpha^{th}$ tone curve corresponding the (j−1)-level region in the desired spatial relationship to the level-j region whose local tone curve is being determined.) Where non-symmetric spatial relationships are important, weighting values 'w' may not be represented by inverse distance relations as used above in EQ. 2. The precise relationships will depend upon the specific spatial pattern being used.

It has been found that the progressive propagation of grayscale control to finer and finer local tone curves allows for very efficient control of relative grayscale between different local regions without resorting to iterative optimization or expensive spatial processing (in terms of time, memory, computational resources or any combination thereof). The architecture outlined in FIG. 2 also supports the use of different tone curve generation methods at different levels (or different tuning of the same method) to achieve each level's unique optimization goals. It has been found that the choice of a very low cost tone curve generation algorithm at level-2 and above can result in significant savings in computational cost.

The multi-scale nature of the disclosed tone mapping operation also allows for easy control of overall image brightness at different "localness" levels, by modifying control points at global, level-1, or level-N tone curves. Adjustment at the global level may be used to match the general brightness of images captured at different exposure settings. For example, if an image is under-exposed by 's' stops, and the output tone level is $t_m$ at median pixel value m of a normally exposed image of the same scene, then the general brightness of the under-exposed image to the normally exposed image may be matched by forcing a control point $[m/2^{-s}, t_m]$ on the global tone curve when tone mapping the under-exposed image. The adjustment on the global tone curve will propagate through the levels of local tone curves, resulting in properly matched overall brightness on the output image without having to clip highlights in the under-exposed image. The disclosed methodology applies in the same way when the brightness of an over-exposed image needs to be adjusted to match that of a normally exposed image.

Referring to FIG. 4A, in some embodiments digital image capture device 400 permits a user 405 to specify a region of interest (ROI) 410 within scene 415 displayed on screen 420. In one embodiment, the ROI may be specified by touch as illustrated in FIG. 4A. In another embodiment the ROI may be moved around the display by the user manipulating a control until the ROI's desired location is reached. In some embodiments, the ROI region may have a fixed size (e.g., 10% of the total display area) and shape (a square centered about a user's touch). In other embodiments, the ROI may have a circular or oval shape and be a different size. In still other embodiments, a user may select both the shape and size of the ROI during device setup (or at another time).

ROI 410 is often associated with a 'tap-to-expose' operation for automatic exposure (AE) control where it may indicate a user's desired focus. The goal of tap-to-expose operations is to properly expose the area of interest that is either over-exposed or under-exposed as a result of the default full-frame exposure optimization. This kind of global exposure parameter adjustment favoring a small area of interest of the full image often means the rest of the image is either over-exposed or under-exposed (i.e., the area outside ROI 410 is poorly rendered both in information-preservation and visual appeal). One such instance is the stage inside a theater. Often the stage is much brighter than the surrounding area. A tap-to-expose operation on the stage can leave everywhere else black (or very dark). On the other hand, if the stage's surroundings are to be shown, the stage may be over-exposed to the point that it is not viewable.

One approach in accordance with this disclosure to avoid such a drastic exposure tradeoff between ROI 410 and the rest of display 420 is to alter tone rendering operations instead of updating the exposure parameter (e.g., via software changes to a camera's image processing pipeline). Consider, for example, the case where a user taps on a dark region of the display: let $x_1$ represent the average signal level of the ROI before the tap and the corresponding tone-mapped signal level based on global tone curve $t_1$ as $y_1$. Based on user input, control software could alter the tone output signal level of the ROI toward an "ideal" level $y_2$. One technique to do this is to apply a power function to the before-tap global tone curve $t_1$ to brighten up the ROI so that with the adjusted tone curve $t_2$, input signal level $x_1$ is mapped to output signal level $y_2$:

$$t_2 = t_1^k, \quad \text{where} \quad k = \frac{\log(y_2)}{\log(y_1)}. \qquad \text{EQ. 3}$$

While this approach is straightforward, in practice it may still result in visually unappealing rendering of some scenes (even though the result is generally better than directly adjusting the exposure parameter). By forcing the global tone output level at $x_1$ to a pre-determined "ideal" level $y_2$ regardless of scene content in other regions, the photometry of the scene can be distorted by compressing or completely flattening the tone distribution of some regions in the image.

In the case of a tap-to-expose operation, a user has indicated that one particular region of the image is more important. Instead of using a global tone statistic to generate a global tone curve and then modifying that tone curve based on the "ideal" output level for the tapped region as described above (see EQ. 3), in another embodiment a first tone curve could be based on an image's global statistic (e.g., luminance information) and another tone curve could be based on just the selected statistic of the ROI. A final global tone curve could then be generated based on a weighted combination of these tone curves:

$$t_2 = F(wh_{ROI} + (1-w)h_G), \qquad \text{EQ. 4}$$

where $t_2$ represents an ROI-biased global tone curve in accordance with this disclosure, F( ) represents any function that may be used to convert a global statistic (e.g., luminance histogram information) into a tone curve, $h_{ROI}$ represents the selected statistic of the ROI, $h_G$ represents the selected statistic of the entire image, and 'w' represents a weight ($0 \le w \le 1$) that reflects the importance or impact the ROI has on the final tone curve $t_2$. For example, when w equals 1, the final tone curve is determined completely by the statistics of the ROI and when w equals 0, the ROI has no effect on the final tone curve. From this it should be understood that weighting factor w represents a tuning parameter that may be set based on the specific use and/or environment for which an image capture device is designed.

While weighting factor 'w' has been described as a tuning factor selected during system development it could also be chosen by a user through, for example, a graphical user-interface. In one embodiment a user could select one of a specified set of values. In another embodiment a user could select any value within a specified range (e.g., 0 to 1). In yet another embodiment, an initial value may be automatically adjusted based on user feedback. For example, images rated very highly could incrementally adjust the value of w in a first direction while images rated lowly by the user could incrementally adjust the value of w in a second direction. In still other embodiments, a captured image could be processed to automatically identify one or more faces (or other specified object). Each face's bounding box could then be treated as a ROI in accordance with this disclosure. An additional weighting factor could be applied to each face's corresponding statistic to account for the likelihood that the identified face is in fact a face. Further, this second weighting factor could be normalized so that the sum of all such factors in an image would equal 1.

Of the parameters identified in EQ. 4, global statistic $h_G$ is generally provided by customized hardware and/or software, F( ) is selected based on the chosen statistic and, as noted above, 'w' may be a tuning parameter selected by the developer. This leaves the ROI statistic $h_{ROI}$ to be determined.

Referring to FIG. 4B, and by way of example, illustrative display 420 has been partitioned into 18 panels or regions for purposes of auto-exposure operations. Illustrative ROI 410 can be seen to overlap regions 425A-425D, which are shown in an enlarged format in FIG. 4C. In accordance with one embodiment, ROI statistic $h_{ROI}$ may be equal to the weighted sum of the display panels or regions (e.g., 425A) which ROI 410 overlaps. For example:

$$h_{ROI} = \frac{A}{|BB25A|}h_{BB25A} + \frac{B}{|BB25B|}h_{BB25B} + \frac{C}{|BB25C|}h_{BB25C} + \frac{D}{|BB25D|}h_{BB25D} \qquad \text{EQ. 5}$$

where |425A|, |425B|, |425C| and |425D| represent the area of each of the identified regions, A represents the area of that portion of ROI 410 that overlaps (or intersects with) region 425A, B represents the area of that portion of ROI 410 that overlaps region 425B, C represents the area of that portion of ROI 410 that overlaps region 425C, and D represents the area of that portion of ROI 410 that overlaps region 425D. Finally, $h_{425A}$, $h_{425B}$, $h_{425C}$ and $h_{425D}$ represent the selected statistic for each of the display's regions which are overlapped by ROI 410 (these values too may be available from an image capture device's image processing pipeline). It should be understood that while FIGS. 4B, 4C and EQ. 5 illustrate an implementation in which the ROI overlaps 4 display regions, such a limitation is not part of the disclosed concept. The number of panels within a given display may be any number appropriate or desired for a given implementation. In addition, not all panels or regions need be the same size or even the same shape. And, since the size of the ROI can vary from implementation to implementation, the number of display regions any given ROI overlaps may also vary. In light of this recognition, ROI statistic $h_{ROI}$ may be specified more generally as:

$$h_{ROI} = \sum_{i=1}^{N}\left(\frac{S_i^{ovlp}}{S_i}\right)h_i, \qquad \text{EQ. 6}$$

where $S_i$ represents the area of region-i that intersects with the ROI, $S_i^{ovlp}$ represents the area of the intersection between the ROI and region-i, $h_i$ represents the selected statistic of region-i, and N equals the number of regions the ROI overlaps.

Figure 5:
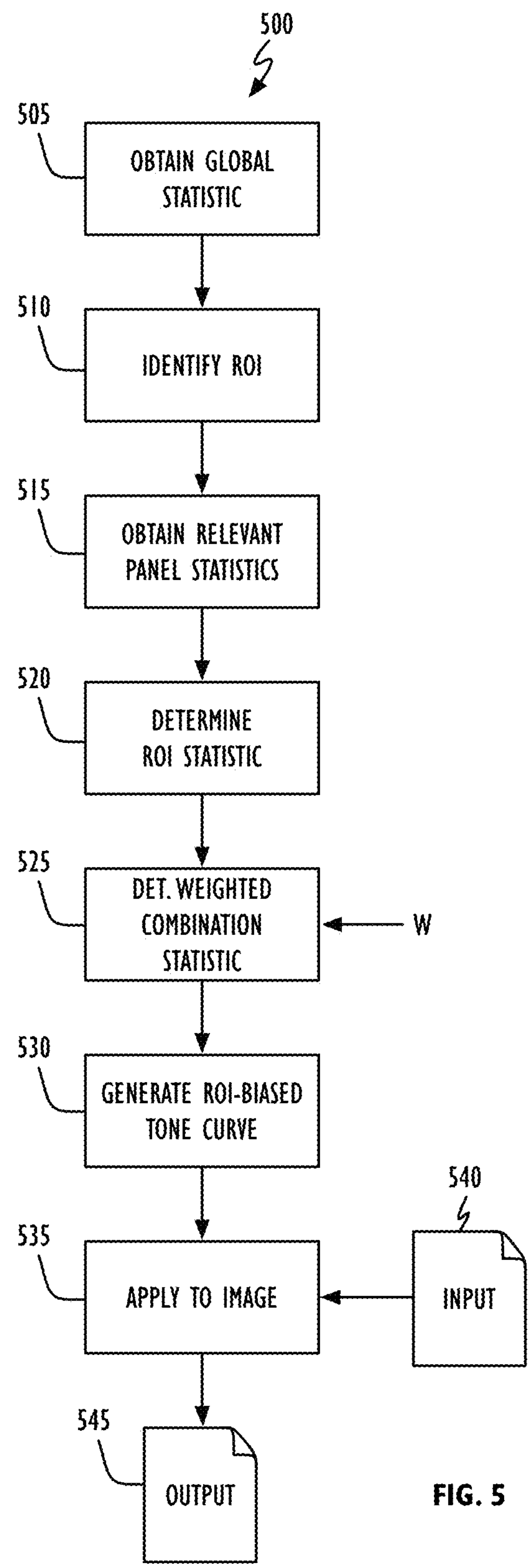
FIG. 5 shows, in flow-chart form, an ROI-biased tone curve generation operation in accordance with one embodiment.

Referring to FIG. 5, ROI-biased tone curve operation 500 in accordance with one embodiment may obtain an image's global statistic from, for example, an image capture device's image processing pipeline (block 505). Location of the ROI within the image frame (block 510) and statistics for the display's underlying auto-exposure regions (block 515) may be obtained and used to generate the ROI statistic in accordance with, for example, EQ. 6 (block 520). A weighted combination of the ROI and global statistics may be determined, with known weight w (block 525), and used to generate an ROI-biased tone curve (block 530). This tone curve may be applied to original image 540 to generate modified image 545. In another embodiment, the ROI-biased tone curve generated in accordance with operation 500 may be applied to a second image. For example, the first image for which the global statistic is obtained may be a pre-image and the image to which the ROI-biased tone curve is applied is the image captured in response to the pre-image. Operations in accordance with blocks 505-525 may also be used to generate an ROI-biased statistic which can be used in a multi-scale tone mapping operation in accordance with, for example, FIG. 2.

Figure 6:
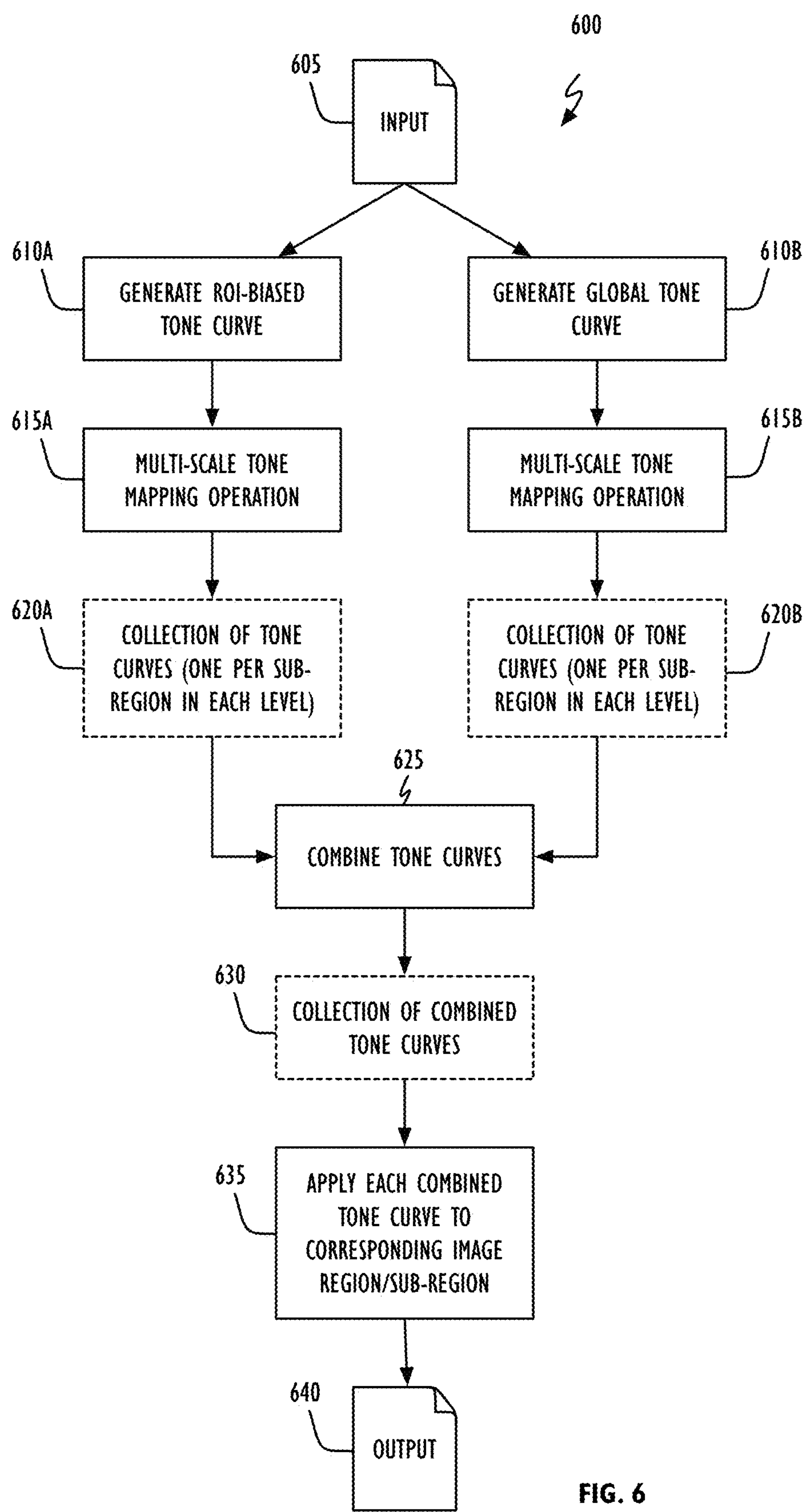
FIG. 6 shows, in flow-chart form, an ROI-biased tone curve generation operation in accordance with another embodiment.

Referring to FIG. 6, ROI-biased tone curve operation 600 in accordance with yet another embodiment uses input image 605 to generate ROI-based (block 610A) and non-biased global tone curves (block 610B). Once generated, each tone curve may be used to initiate a multi-scale tone mapping operation in accordance with, for example, FIG. 2 (blocks 615A and 615B). As noted above, the result of multi-scale tone mapping operations is a collection of local tone curves—one for each region/sub-region of each level (blocks 620A and 620B). By way of example, if level-0 of input image 605 consists of a single region and level-1 48 sub-regions (e.g., in a 6-by-8 grid), each collection of tone curves in accordance with blocks 620A and 620B would consist of 49 tone curves (1+48). If each of the 48 sub-regions in Level-1 were further divided into 12 sub-regions to create a level-3 (e.g., in a 3-by-4 grid), each collection of local tone curves in accordance with blocks 620A and 620B would consist of 625 tone curves (1+48+(48×12)). In accordance with operation 625, each corresponding pair of tone curves from tone curve collections 620A and 620B may be combined in a weighted fashion to generate an equal number of combined tone curves (block 630). For example, each tone curve at level-M from collection 620A may be combined with the spatially corresponding tone curve from level-M in collection 620B. In this manner, if there are N total tone curves in each of tone curve collections 620A and 620B, the collection of combined tone curves will have N tone curves. In one embodiment, the combination in accordance with block 625 may be facilitated by a weight map, where the weight map may be structured identically to the collections of tone curves 620A and 620B. For example, if level-0 of input image 605 consists of a single region and level-1 48 sub-regions as described above, a weight map in accordance with one embodiment may consist of 49 weight values: 1 value corresponding to level-O's single region and another value for each of level-1's 48 sub-regions. Conceptually, each value may be thought of as the weight value in EQ. 4. Finally, the collection of combined tone curves 630 may be applied in a bottom-to-top manner (block 635) to generate output image 640.

Figure 7:
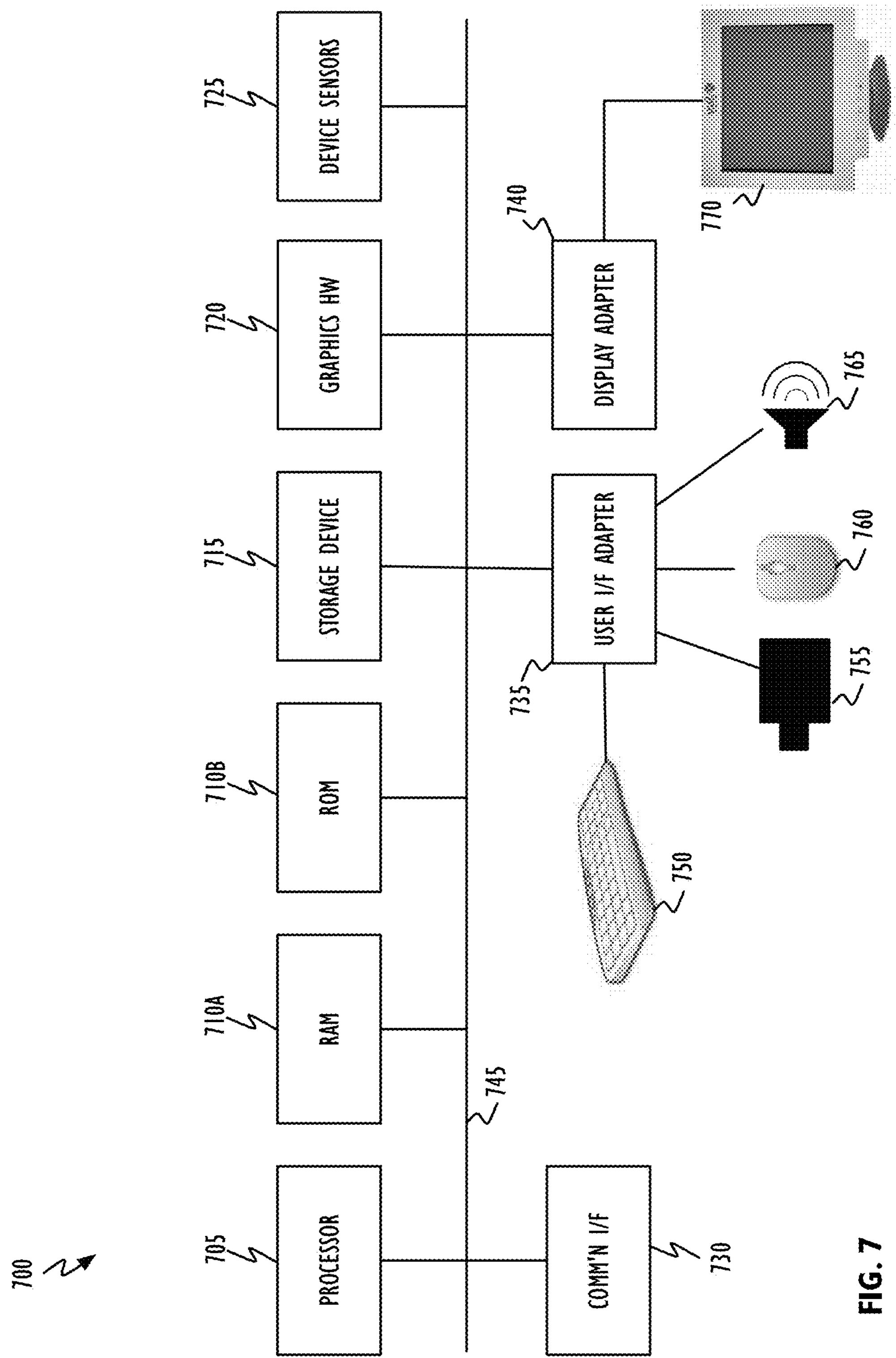
FIG. 7 shows, in block diagram form, a computer system in accordance with one embodiment.

Referring to FIG. 7, some of the disclosed embodiments may be performed by representative computer system 700 (e.g., a general purpose computer system or a dedicated image processing workstation). Computer system 700 may include one or more processors 705, memory 710 (710A and 710B), one or more storage devices 715, graphics hardware 720, device sensors 725 (e.g., proximity sensor/ambient light sensor, accelerometer and/or gyroscope), communication interface 730, user interface adapter 735 and display adapter 740—all of which may be coupled via system bus or backplane 745. Memory 710 may include one or more different types of media (typically solid-state) used by processor 705 and graphics hardware 720. For example, memory 710 may include memory cache, read-only memory (ROM), and/or random access memory (RAM). Storage 715 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 710 and storage 715 may be used to retain media (e.g., audio, image and video files), preference information, device profile information, computer program instructions organized into one or more modules and written in any desired computer programming language, and any other suitable data. When executed by processor 705 and/or graphics hardware 720 such computer program code may implement one or more of the methods described herein. Communication interface 730 may be used to connect computer system 700 to one or more networks. Illustrative networks include, but are not limited to: a local network such as a USB network; a business' local area network; or a wide area network such as the Internet and may use any suitable technology (e.g., wired or wireless). User interface adapter 735 may be used to connect keyboard 750, camera or image capture device 755, pointer device 760, speaker 765 and other user interface devices such as a touch-pad and/or a touch screen (not shown). Display adapter 740 may be used to connect one or more display units 770.

Processor 705 may execute instructions necessary to carry out or control the operation of many functions performed by computer system 700 (e.g., such as the generation of multi-scale tone maps in accordance with FIG. 2 or ROI-biased tone curves in accordance with FIGS. 5 and 6). Processor 705 may, for instance, drive display 770 and receive user input through user interface adapter 735. A user interface can take a variety of forms, such as a button, keypad, dial, a click wheel, keyboard, display screen and/or a touch screen. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs). In addition, graphics hardware 720 or image capture device 755 may include specialized hardware for image processing tasks. For example, a custom image processing pipeline (IPP) that takes as input RAW images from a sensor in device 755 and performs RAW processing, RGB processing and YCbCr processing. In one embodiment, image statistics such as luminance histograms may be provided during RGB processing in the IPP.

Figure 8:
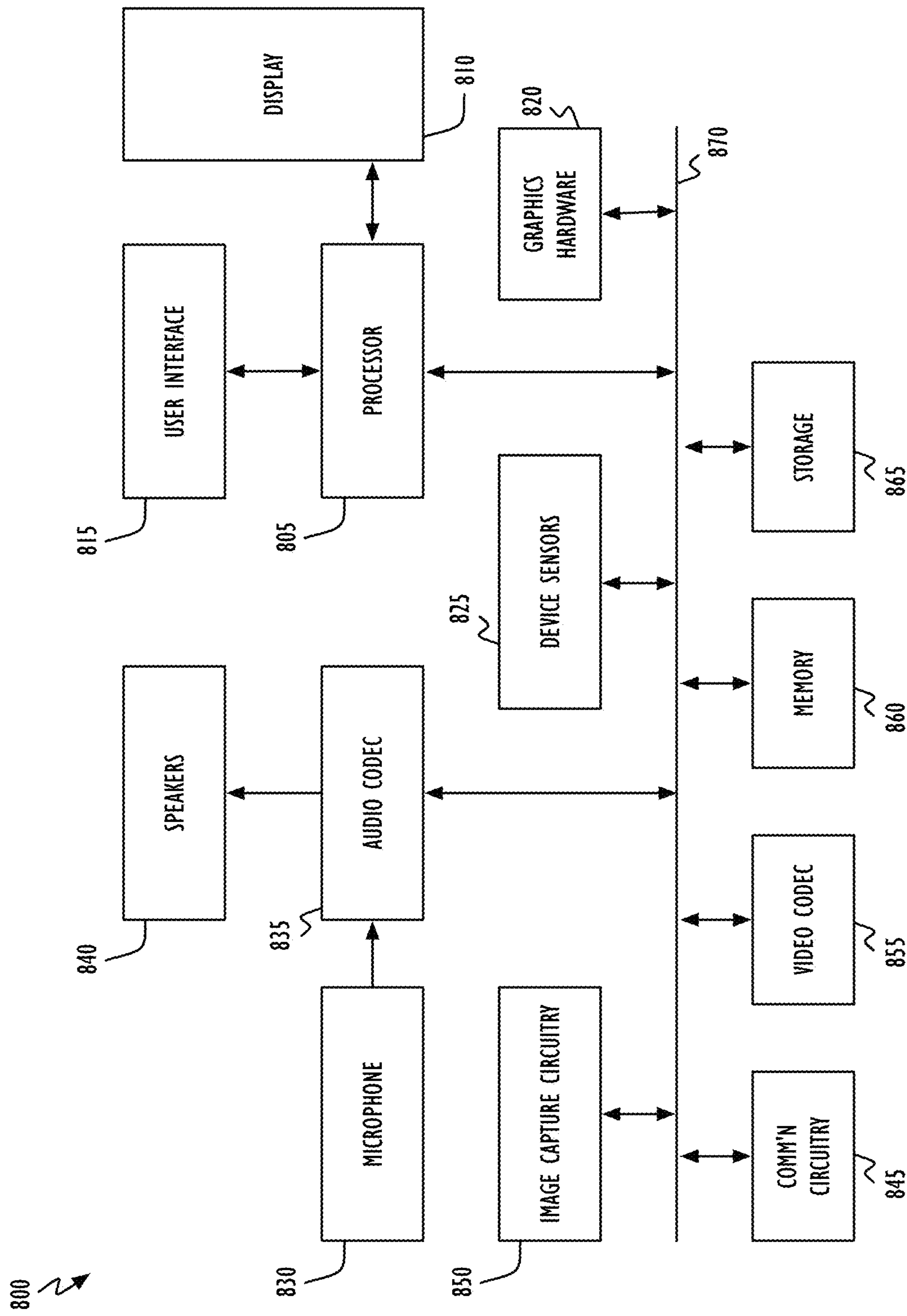
FIG. 8 shows, in block diagram form, a multi-function electronic device in accordance with one embodiment.

Referring to FIG. 8, a simplified functional block diagram of illustrative electronic device 800 is shown according to one embodiment. Electronic device 800 could be, for example, a mobile telephone, personal media device, portable camera, or a tablet or notebook computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, image capture circuit or unit 850, video codec(s) 855, memory 860, storage 865, and communications bus 870.

Processor 805 may execute instructions necessary to carry out or control the operation of many functions performed by device 800 (e.g., such as the generation of tone curves in accordance with FIGS. 2, 5 and 6). Processor 805 may, for instance, drive display 810 and receive user input from user interface 815. User interface 815 can take a variety of forms, such as a button, keypad, dial, a click wheel, keyboard, display screen and/or a touch screen. Processor 805 and Graphics hardware 820 may be as described above with respect to FIG. 7.

Image capture circuitry 850 may capture still and video images that may be processed to generate images and may, in accordance with this disclosure, include processing images in accordance with FIGS. 1-6. Output from image capture circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 and storage 865 may be as described above with respect to FIG. 7.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to process an image, comprising:
obtaining a first image of a scene from a memory;
obtaining a first statistic of an entirety of the first image;
identifying a region-of-interest (ROI) of the first image, wherein the ROI comprises less than the entirety of the first image;
obtaining the first statistic of the ROI of the first image;
determining a single tone curve for the first image that is ROI-biased based on a weighted combination of the first statistic of the entirety of the first image and the first statistic of the ROI of the first image;
applying the single tone curve to a second image to generate a tone-mapped image; and
storing the tone-mapped image in the memory.

2. The method of claim 1, wherein the first statistic comprises a statistic based on image luminosity.

3. The method of claim 1, wherein obtaining a first image comprises:
obtaining from a camera's image sensor, a pre-image; and
displaying the pre-image on a display element of the camera.

4. The method of claim 3, wherein identifying a region-of-interest (ROI) comprises:
receiving an input from the display element indicative of an area of the display element;
translating the indicated area of the display element to a corresponding area of the pre-image; and
identifying the corresponding area of the pre-image as the ROI.

5. The method of claim 4, wherein the display element comprises a touch-sensitive display element.

6. The method of claim 3, wherein applying the single tone curve to a second image comprises:
receiving a capture command from the camera;
obtaining the second image from the camera's image sensor in response to the capture command; and
applying the single tone curve to the second image to generate the tone-mapped image.

7. The method of claim 6, further comprising displaying the tone-mapped image on the display element.

8. An image capture device, comprising:
an image sensor;
a memory operatively coupled to the image sensor and having stored therein processor-executable instructions;
a display operatively coupled to the memory; and
one or more processors operatively coupled to the image sensor, the memory and the display, wherein the one or more processors are programmed to execute the processor-executable instructions and, in response thereto—
obtain a pre-image of a scene from the image sensor;
obtain a first statistic of an entirety of the pre-image;
display the pre-image on the display;
receive an input that identifies a region-of-interest (ROI) of the pre-image, wherein the ROI comprises less than the entirety of the pre-image;
obtain a first statistic of the ROI of the pre-image;
determine a weighted combination of the first statistic of the entirety of the pre-image and the first statistic of the ROI to generate a ROI-biased first statistic;
determine a single tone curve based on the ROI-biased first statistic;
obtain a first image of the scene from the image sensor;
apply the single tone curve to the first image to generate a second image; and
store the second image in the memory.

9. The image capture device of claim 8, wherein the first statistic comprises a statistic based on luminosity.

10. The image capture device of claim 8, wherein when the one or more processors execute the instructions to identify a ROI of the pre-image, the one or more processors:
receive an input indicative of an area of the display;
translate the indicated area of the display to a corresponding area of the pre-image; and
identify the corresponding area of the pre-image as the ROI.

11. The image capture device of claim 10, wherein the display comprises a touch-sensitive display.

12. The image capture device of claim 8, wherein when the one or more processors execute the instructions to generate the ROI-biased first statistic, the one or more processors combine the first statistic of the ROI (X) and the first statistic of the entirety of the pre-image (Y) as follows: (ROI-biased first statistic)=wX+(1−w)Y, where 'w' represents a weight value.

13. The image capture device of claim 8, wherein when the one or more processors execute the instructions to obtain a first image, the one or more processors:
receive a capture command from the image capture device;
cause, in response to the capture command, the image sensor to capture the first image.

14. A non-transitory program storage device comprising instructions stored thereon to cause one or more processors to:
obtain a first image of a scene;
obtain a first statistic of an entirety of the first image;
identify a region-of-interest (ROI) of the first image, wherein the ROI comprises less than the entirety of the first image;

obtain a first statistic of the ROI of the first image;

determine a single tone curve for the first image that is ROI-biased based on a weighted combination of the first statistic of the entirety of the first image and the first statistic of the ROI;

obtain a second image of the scene;

apply the single tone curve to the second image to generate a third image; and store the third image in a memory.

15. The non-transitory program storage device of claim 14, wherein the instructions to cause the one or more processors to obtain a first image comprise instructions to cause the one or more processors to:

obtain a pre-image of the scene from an image sensor of an image capture device; and display the pre-image on a touch-sensitive display of the image capture device.

16. The non-transitory program storage device of claim 15, wherein the instructions to cause the one or more processors to obtain a first statistic of the entirety of the first image comprise instructions to cause the one or more processors to obtain a statistic based on the first image's luminosity.

17. The non-transitory program storage device of claim 16, wherein the statistic based on luminosity comprises a luminosity histogram.

18. The non-transitory program storage device of claim 15, wherein the instructions to cause the one or more processors to identify a ROI comprise instructions to cause the one or more processors to:

receive an input indicative of an area of a touch-sensitive display of an image capture device;

transform the indicated area of the touch-sensitive display to a corresponding area of the pre-image; and identify the corresponding area of the pre-image as the ROI.

19. The non-transitory program storage device of claim 18, wherein the instructions to cause the one or more processors to obtain a second image comprise instructions to cause the one or more processors to capture the second image using the image sensor in response to an input from an image capture control of the image capture device.

* * * * *